United States Patent
Fatato et al.

(10) Patent No.: US 7,241,354 B2
(45) Date of Patent: Jul. 10, 2007

(54) NON-SLIP CONVEYOR AND METHOD FOR PRODUCING SAME

(75) Inventors: Frank B. Fatato, Exton, PA (US); Brian Roberts, Landisville, PA (US)

(73) Assignee: Fenner U.S., Inc., Manheim, PA (US)

( * ) Notice: Subject to any disclaimer, the term of this patent is extended or adjusted under 35 U.S.C. 154(b) by 149 days.

(21) Appl. No.: 10/978,682

(22) Filed: Nov. 1, 2004

(65) Prior Publication Data

US 2005/0115808 A1 Jun. 2, 2005

Related U.S. Application Data

(63) Continuation-in-part of application No. 10/767,954, filed on Jan. 29, 2004, now Pat. No. 7,004,311.

(60) Provisional application No. 60/443,891, filed on Jan. 31, 2003.

(51) Int. Cl.
B32B 31/18 (2006.01)
B65G 15/00 (2006.01)

(52) U.S. Cl. ............ 156/137; 156/266; 156/292; 156/324; 198/850; 198/853

(58) Field of Classification Search .............. None
See application file for complete search history.

(56) References Cited

U.S. PATENT DOCUMENTS

| 72,181 | A | 12/1867 | Fountain |
|---|---|---|---|
| 1,177,664 | A | 4/1916 | Vuilleumier |
| 1,182,933 | A | 5/1916 | Schulte |
| 1,438,566 | A | 12/1922 | Wiggins |
| 1,519,165 | A | 12/1924 | Pilliner |
| 2,969,686 | A * | 1/1961 | Runton ............ 474/241 |
| 3,154,961 | A | 11/1964 | Creswell |
| 3,288,273 | A | 11/1966 | Michaelson et al. |
| 3,345,113 | A | 10/1967 | Siber |
| 3,387,500 | A | 6/1968 | Hutzenlaub et al. |
| 3,418,862 | A | 12/1968 | Hurbis |
| 3,857,478 | A | 12/1974 | Meeusen |
| 3,991,632 | A | 11/1976 | Stephens |
| 4,015,038 | A | 3/1977 | Romanski et al. |
| 4,028,956 | A | 6/1977 | Thompson |
| 4,055,265 | A | 10/1977 | Eiserman |
| 4,377,365 | A | 3/1983 | Layh |
| 4,458,809 | A | 7/1984 | White et al. |
| 4,550,823 | A | 11/1985 | Gladish |

(Continued)

FOREIGN PATENT DOCUMENTS

JP 59-97345 4/1984

*Primary Examiner*—Sam Chuan C. Yao
(74) *Attorney, Agent, or Firm*—Stephen H. Eland; Dann, Dorfman, Herrell and Skillman

(57) ABSTRACT

A belt for conveying elements in provided wherein the belt comprises a compressible layer attached to the top surface of the belt. Preferably the compressible layer is resiliently deformable to cushion the impact of items on the belt or to provide a gripping surface. The belt preferably is a link belt and the top surface of the belt comprises a bonding layer for adhering the compressible element to the belt. The bonding layer may be a thermoplastic urethane that is heat fusible with the compressible layer to adhere the compressible layer to the belt.

27 Claims, 6 Drawing Sheets

U.S. PATENT DOCUMENTS

| | | |
|---|---|---|
| 4,588,073 A | 5/1986 | Abell |
| 4,675,229 A * | 6/1987 | Westhead ............... 428/222 |
| 4,688,615 A | 8/1987 | Lee |
| 4,903,824 A | 2/1990 | Takahashi |
| 4,922,304 A | 5/1990 | Gilbert et al. |
| 4,925,013 A | 5/1990 | Lapeyre |
| 4,957,199 A | 9/1990 | Wokke et al. |
| 5,011,003 A | 4/1991 | Gladding |
| 5,176,246 A | 1/1993 | Wiggers et al. |
| 5,332,786 A * | 7/1994 | Nagata et al. ............ 525/130 |
| 5,361,893 A | 11/1994 | Lapeyre et al. |
| 5,507,383 A | 4/1996 | Lapyere et al. |
| 5,564,558 A | 10/1996 | Hampton et al. |
| 5,582,287 A | 12/1996 | Heit et al. |
| 5,658,634 A | 8/1997 | Ragland et al. |
| 5,667,058 A | 9/1997 | Bonnet |
| 5,853,849 A | 12/1998 | Nishio et al. |
| 5,984,082 A | 11/1999 | Geib |
| 6,062,379 A | 5/2000 | Geib et al. |
| 6,173,831 B1 | 1/2001 | Grabscheid et al. |
| 6,770,004 B1 | 8/2004 | Lofgren et al. |
| 7,004,311 B2 | 2/2006 | Fatato et al. |

* cited by examiner

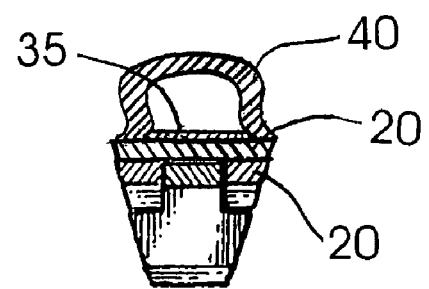
Fig. 2
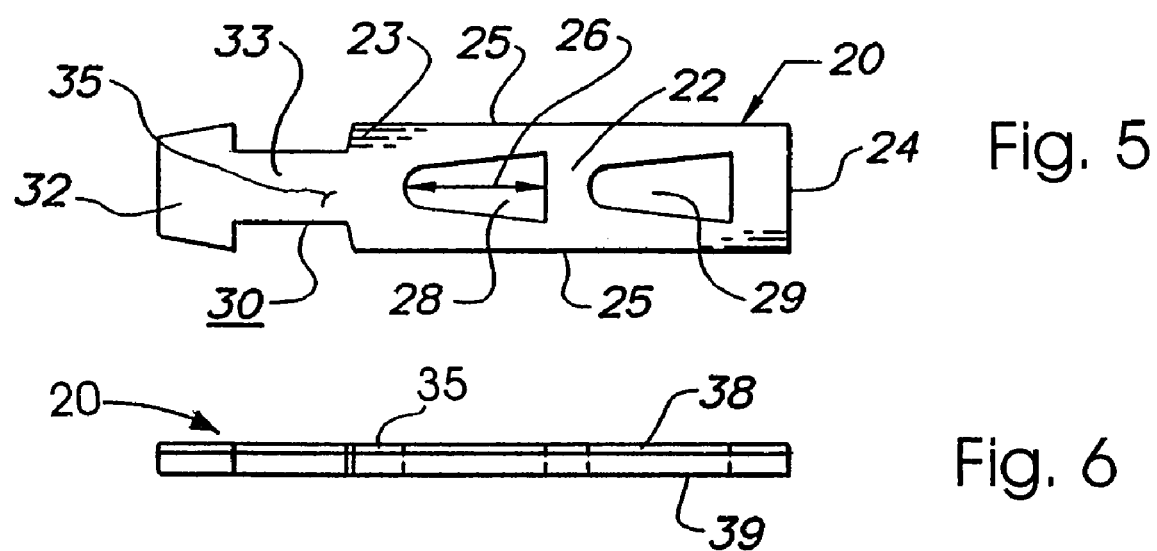
Fig. 5
Fig. 6

NON-SLIP CONVEYOR AND METHOD FOR PRODUCING SAME

RELATED APPLICATIONS

The present application is a continuation-in-part of U.S. patent application Ser. No. 10/767,954, filed Jan. 29, 2004 now U.S. Pat. No. 7,004,311. The present application also claims priority to U.S. Provisional Patent Application No. 60/443,891, filed Jan. 31, 2003. Each of the foregoing applications is hereby incorporated herein by reference.

FIELD OF THE INVENTION

The present invention relates to interlocking-link conveyor belts and has particular use in applications in which the conveyor is used to convey a workpiece and an increased gripping force between the conveyor and the workpiece is desired to reduce slippage between the conveyor and the workpiece. The present invention also relates to providing a belt having an upper surface that has a resiliently deformable surface.

BACKGROUND OF THE INVENTION AND DISCUSSION OF PRIOR ART

Link belts are generally known and used in a variety of applications, such as transmission belts and conveyor belts. When used as a conveyor, there may be slippage between the conveyor and the workpiece being conveyed. In some applications, it is desirable to reduce the slippage between the conveyor and the workpiece.

In addition, when used as a conveyor, frequently the material being conveyed is dropped onto the belt or manipulated so that the shock of the impact of the material onto the belt causes significant noise and/or vibration. The vibration can lead to accelerated wear of various components of the conveyor assembly. In addition, the significant noise produced by the impacting material degrades the work place environment and introduces dangers associated with high-noise environments.

SUMMARY OF THE PREFERRED EMBODIMENTS

A conveyor assembly comprising a continuous belt and a compressible gripping layer is provided. The belt is designed with sufficient tensile strength to convey the weight of the material being transported. This allows the material comprising the gripping layer to be selected without significant regard to the tensile strength of the material. A compressible layer is connected to the belt to form a gripping layer that also operates as a shock absorbing layer operable to resiliently deform to absorb the impact of material when material is placed on the top side of the conveyor assembly.

In a preferred embodiment, the compressible layer is a continuous hollow layer that is bonded to the top surface of the belt. In another embodiment, the compressible layer is formed of a plurality of separate compressible elements attached to the belt. Further, preferably the belt is formed of a plurality of interlocking links, and the separate compressible elements allow a belt link to be replaced without affecting the compressible elements on adjacent links.

A method for producing a belt is also provided. According to the method, a compressible layer is attached to the top surface of a belt. More specifically, preferably, the method includes the step of providing a belt having a top surface and adhering a compressible layer to the top surface. This may be accomplished by applying a bonding material to the top layer of the belt and then adhering the compressible layer via the bonding material.

In a preferred method, the bonding material is a layer of thermoplastic polyurethane on the top surface of the belt, and the compressible layer is also a thermoplastic material. The compressible layer is attached to the belt by heat fusing the compressible layer with the polyurethane bonding layer. Further, in a preferred method, the belt is comprised of a plurality of interlocking belt links and the method comprises the step of applying the bonding material to the top surface of sheet material and then cutting the belt links out of the sheet material. In yet another method, the compressible layer is cut after it is adhered to the belt.

BRIEF DESCRIPTION OF THE DRAWINGS

FIG. 2 is a cross-sectional view of the conveyor assembly illustrated in FIG. 1.

FIG. 5 is a top view of an individual link of the belt shown in FIG. 1 prior to assembly.

FIG. 6 is a side view of the individual belt link shown in FIG. 5.

DETAILED DESCRIPTION OF THE PREFERRED EMBODIMENTS

Figure 1:
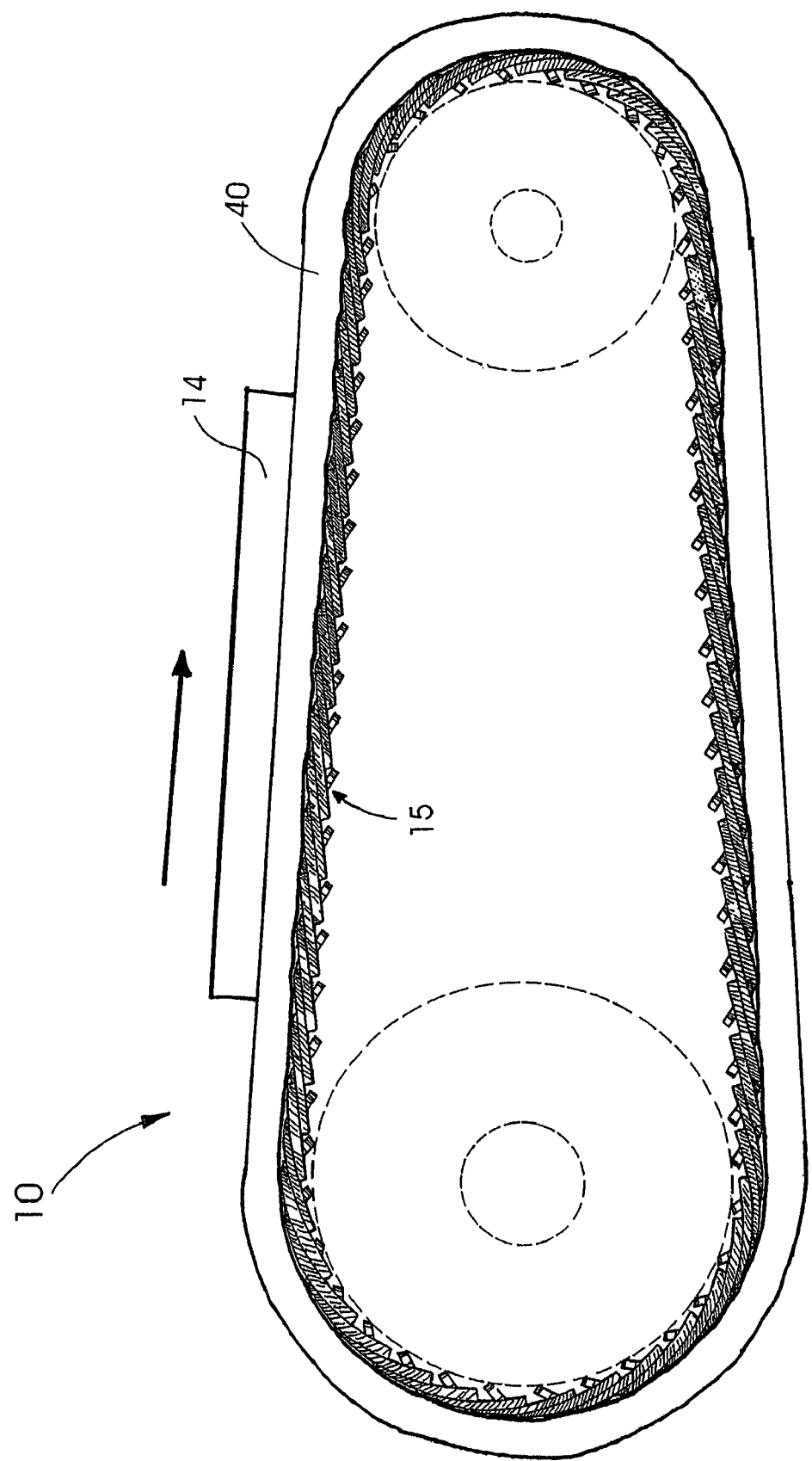
FIG. 1 is a side view of an interlocking-link conveyor assembly having a non-slip surface shown transporting a workpiece and engaged by a driving mechanism for the assembly.

Referring now to the drawings in general and FIG. 1 specifically, the preferred embodiment of a conveyor assembly comprising a belt 15 having a non-slip gripping layer 40 is designated generally 10. The assembly 10 is shown transporting a workpiece 14. When the workpiece is placed on the conveyor assembly 10, the gripping layer engages the workpiece. The gripping layer 40 preferably is deformable and has a high coefficient of friction to prevent slippage between the workpiece and the conveyor assembly 10.

In a preferred embodiment, the belt 10 is a link belt having a top surface that forms a bonding surface 35. Preferably, after the link belt 15 is formed, the gripping layer 40 is then bonded to the bonding surface 35 of the link belt.

The gripping layer 40 is preferably an elastically deformable layer that over lies the length of the belt. In this way, when a workpiece is placed on the belt, it is placed onto the gripping layer 40. Alternatively, when used in a power transmission application, the gripping layer 40 is used as a drive surface to engage and drive cooperating elements. For example, in one application, the belt can be used to drive the rollers in a skate roller bed, as discussed further below. The gripping layer 40 frictionally engages the rollers to drive the rollers.

Figure 3:
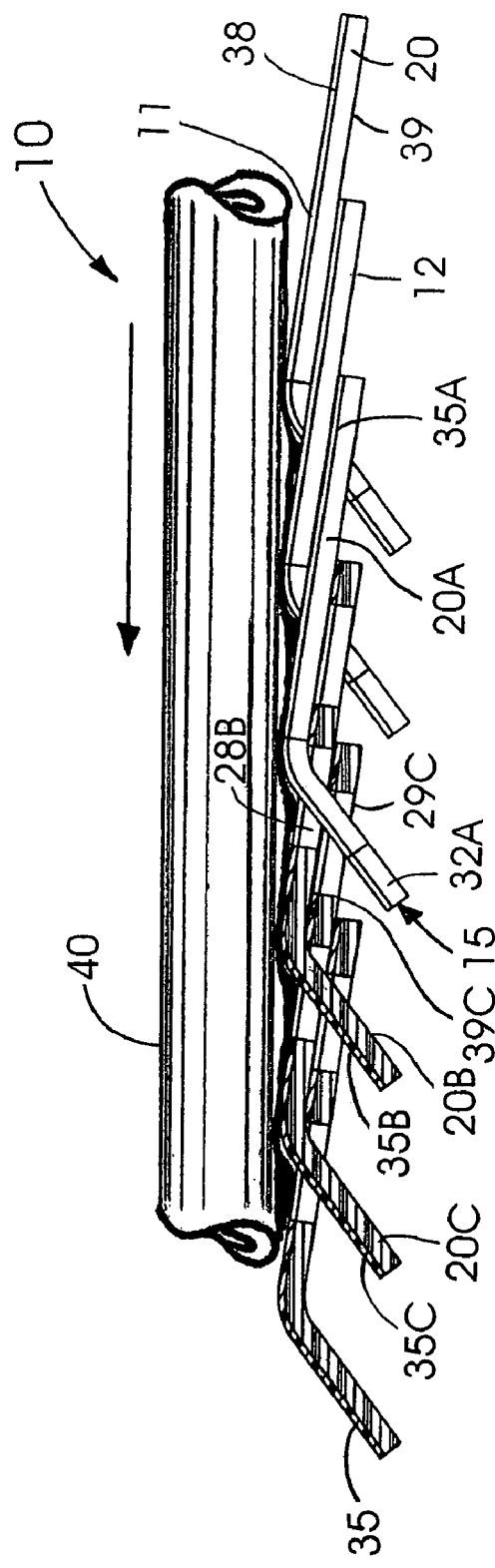
FIG. 3 is a fragmentary side view partially in section, of the belt shown in FIG. 1.
Figure 4:
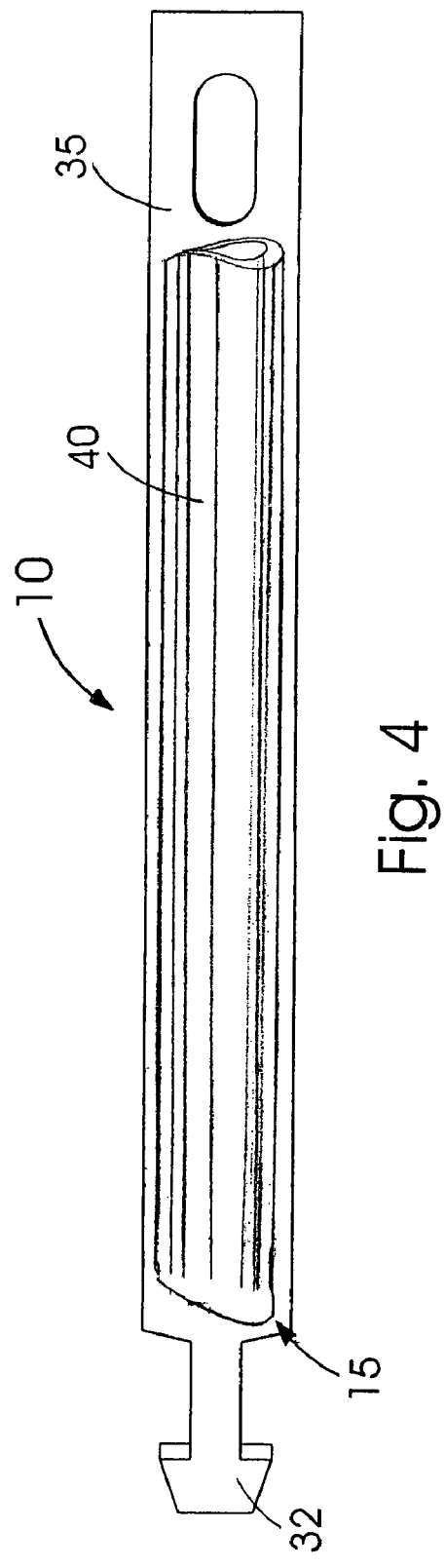
FIG. 4 is a plan view of the belt shown in FIG. 3.

Referring now to FIGS. 3 and 4, the belt 15 preferably comprises a series of interlocking belt links 20. One of the individual links 20 that comprise belt 15 is illustrated in FIGS. 5 and 6. Each belt link 20 has a body portion 22 and a fastener 30 connected to the body portion. In the present instance, the thickness of the belt link 20 between the top surface 38 and the bottom surface 39 is substantially uniform throughout the entire link.

A bonding material is permanently bonded to the top surface of each belt link 20. The bonding material forms a bonding surface 35 that is coextensive with the top surface of the belt link 20. Preferably, the bonding surface 35 is approximately 1 mm or less.

When the belt links are assembled to form a belt 15, the bonding surface 35 can be used to bond the gripping layer 40 to the belt. Preferably, the bonding surface 35 is formed of a thermoplastic urethane and has a coefficient of friction that is greater than 1. In addition, preferably the bonding surface 35 has a coefficient of friction that is higher than the coefficient of friction of the bottom surface 39 of the belt link 20.

The body portion 22 of the belt link 20 is generally rectangular, having two edges 25 extending longitudinally between a leading end 23 and a trailing end 24, both of which extend transversely between the two edges. Adjacent leading end 23 a leading aperture 28 extends through the thickness of body portion 22. Longitudinally spaced from the leading aperture 28 adjacent the trailing end 24, a trailing aperture 29 extends through the thickness of body portion 22.

The leading end 23 corresponds to the direction in which the assembly 10 travels as shown by the arrow in FIG. 1. However, the direction in which the assembly 10 travels can be reversed so that the leading end 23 does not lead the trailing end 24 with respect to the actual travel of the assembly.

The fastener 30 integrally connects the body portion 22, and comprises a fastening tab 32 and a constricted neck 33. The neck extends longitudinally, with one end connected to the fastening tab 32, and the other end connected to the leading end 23 of body 22. The length of the neck 33 between the leading end 23 and the fastening tab 32 is sufficiently long to allow the fastening tab 32 to extend through the apertures in two belt links 20 as will be further discussed below.

The fastening tab 32 is generally trapezoidal shaped, having two parallel ends that are transverse the neck 33. The fastening tab 32 is substantially wider than the neck 33, being widest at the point where it intersects the neck, and tapering as it extends away from the neck.

The belt links 20 are connected by passing the link fasteners through the apertures in adjacent belt links. To ensure that the belt links can properly connect, the apertures are configured and dimensioned with reference to the fastening tab and the neck.

In the present instance, the apertures through body 22 are non-circular. Both apertures 28 and 29 are longitudinally elongated so that their length 26 is greater than their width. To ensure that fastening tab 32 can pass through the apertures, the length of the apertures 26 is greater than the greatest width of the fastening tab 32.

The width of apertures 28 and 29 is not constant. Instead, the apertures widen as they extend toward trailing end 24. To provide proper connection between the belt links 20, the apertures are narrower than the fastening tab width so that the fastening tab 32 cannot pass back through the apertures once the belt links are connected. However, the apertures are wider than the neck 33 to allow the neck to extend through the apertures while the belt links are connected, as will be discussed below.

The belt links 20 are made of a material of sufficient tensile strength to convey the weight of the workpiece 14 or transmit the necessary power, if used in a power transmission application. In the preferred embodiment, the belt links 20 are made of a thermoset urethane that is reinforced with a polyester fabric.

Because the belt links have sufficient tensile strength to convey the weight of the workpiece 14, the material used to make the gripping layer 40 can be chosen according to characteristics such as deformability, resilience and coefficient of friction, without significant regard to its tensile strength. A variety of resilient elastomeric materials can be used. In the preferred embodiments, the gripping layer 40 is made from a thermoplastic urethane.

The gripping layer 40 is preferably formed as a separate element that is attached to the surface of the belt. Referring to FIGS. 2-3, in the present instance the gripping layer 40 is an extruded hollow generally cylindrical element formed of a resilient thermoplastic urethane. Preferably the wall thickness of the gripping layer is relatively thin (i.e. less than ¼") so that the gripping layer can readily collapse or compress when it engages another element.

As previously stated, the assembly 10 comprises an interlocking-link belt 15 having a gripping layer 40, which is comprised of a plurality of belt links 20 that have been described above. The following discussion describes the interconnections between the belt links 20 that form the belt 15.

As shown in FIGS. 3 and 4, a series of belt links 20 are arranged in a superimposed successive overlapping relation to form the belt 15 with a bonding surface 35. The bottom surface 39 of each belt link overlaps the top surface 38 of an adjoining belt link, so that the thickness of the belt 15 is at least twice the thickness of an individual belt link 20.

FIG. 3 illustrates a portion of the assembly 10, showing how the bonding layers 35 of the belt links combine to form a bonding surface when the belt links are interconnected. Included in these views is the connection between a belt link 20A, and the two preceding belt links, 20B, and 20C. In this connection, the fastening tab 32A of belt link 20A passes sideways through apertures in the two preceding belt links. It first passes through the leading aperture 28B of the adjacent preceding belt link 20B and then passes through the trailing aperture 29C of the next preceding belt link 20C.

The term preceding is used with respect to the direction the assembly travels, as shown in by the arrow in FIG. 3. Because the direction of travel can be reversed, the preceding belt links can be succeeding with respect to the actual travel of the assembly 10.

After passing through the aperture in belt link 20C, the belt link fastening tab 32A is twisted to bear against the bottom surface 39C of belt link 20C. When connected in this way, the top surface of belt link 20A is the top side 11 of belt 15, and the bottom surface 39C of belt link 20C is the bottom side 12 of belt 15.

Referring to FIG. 2, the belt 15 is produced as follows. The belt links 20 that make up the belt 15 include at least one layer of reinforcing material, such as woven polyester sheet. The reinforcing material is impregnated with a binding material to form a composite material. The binding material is liquified and deposited onto the reinforcing material while liquid. Preferably, the composite material includes a plurality of layers of reinforcing material and the binding material is a thermoset urethane.

A bonding material is deposited on the composite material, preferably while the binding material is wet. In other words, preferably the bonding material is deposited on the composite material before the composite material is cured or dried. The bonding material may be sprayed on, poured on or the composite material may be partially submerged in a bath of bonding material. The bonding material may be a chemical adhesive, such as an epoxy. However, preferably the bonding material is a film of thermoplastic urethane that is approximately coextensive with the upper surface of the composite material. Since the bonding material of the composite material is wet when the film is placed on the composite material, the film adheres to the composite material.

After the bonding material is deposited on the composite material, the combination is cured. During the curing process the layer of bonding material permanently bonds to the composite material.

Ordinarily the cured material is at least several times wider that the width of the belt links 20. The cured material is therefore cut into a plurality of elongated strips approximately as wide as the width of a belt link 20. The belt links are then cut-out from the strips of cured material. In the present instance, the belt links are formed by punching, which also simultaneously punches the rearward and forward apertures in the belt links.

Formed in this way, the belt links 20 have an integral bonding surface approximately 1 mm thick forming the top surface 38 of the belt link. The bonding surface is coextensive with the substrate material forming the belt link 20 which in the present instance is polyester reinforced thermoset urethane.

The belt links 20 are assembled to form a continuous interlocking link belt 15. The belt links 15 are connected to one another as detailed above and shown in FIGS. 3 and 4. Preferably, the assembled belt is then trimmed by cutting the edges of the belt to form beveled edges that engage the sheaves of the pulleys about which the conveyor assembly 10 travels.

The gripping layer 40 is preferably attached to the belt 15 after the belt is formed, but before the ends of the belt are connected to form a continuous loop. As described above, preferably the bonding surface 35 is formed of a thin layer of the thermoplastic urethane that is adhered to the top surface of the belt links. To attach the gripping layer 40, the gripping layer is placed on top of the belt. Heat is then applied to the gripping layer and the bonding surface to fuse the gripping layer and bonding surface together. In other words, heat is applied so that the thin layer of urethane on the top surface of the belt melts together with the bottom wall of the gripping layer, which preferably is also formed of urethane.

Preferably the gripping layer 40 is a continuous layer that extends around the entire length of the belt 15. Accordingly, the ends of the gripping layer 40 are spliced together, preferable by heating the ends of the belt to fuse the ends together. In this way, preferably the gripping layer forms a continuous outer surface having a substantially uniform surface along the entire length of the belt.

As discussed previously, the conveyor assembly 10 can be used in power transmission applications as well. Referring to FIG. 3, the conveyor assembly 10 is used to drive a rollerbed 50. The gripping layer 40 operates as an elongated pad that frictionally engages rollers 52 in the rollerbed 50.

As the conveyor assembly 10 is driven forwardly, the frictional engagement between the gripping layer 40 and the rollers 52 cause the rollers to rotate. This in turn causes any workpieces on top of the rollerbed 50 to be displaced along the rollerbed.

Figure 7:
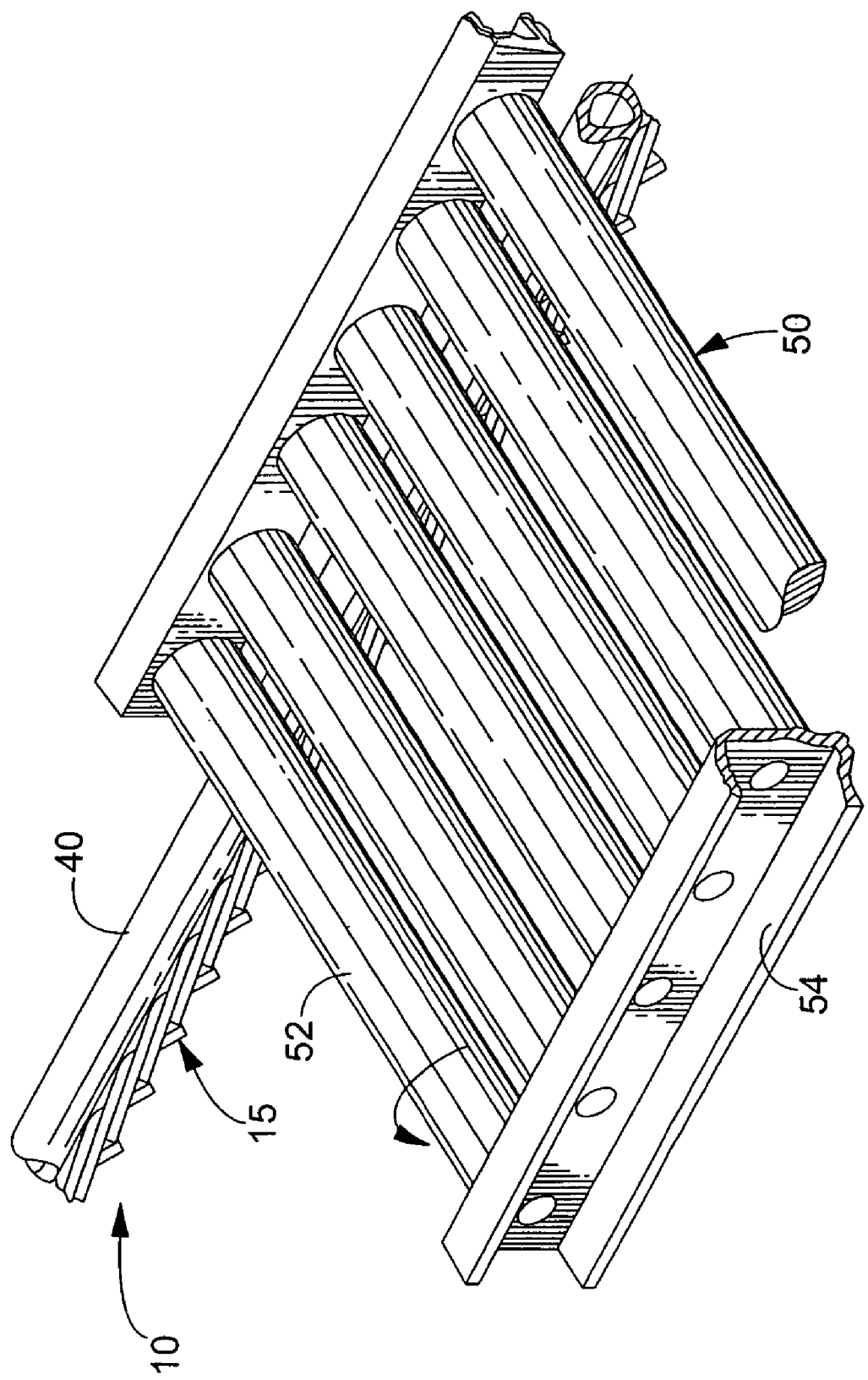
FIG. 7 is a perspective view of the belt illustrated in FIG. 1 showing the belt in use in a power transmission application.

The rollerbed comprises a pair of parallel siderails 54 that support a plurality of skate wheel rollers 52 journaled between the siderails in a parallel array forming a rollerbed having a conveying surface parallel to the longitudinal run of the conveyor assembly 10. The conveyor bed is positioned above the longitudinal run of the gripping layer 40 such that the longitudinal motion of the gripping layer in one direction along the length of the bed in frictional engagement with the undersides of the parallel rollers, causes the plurality of rollers 52 to rotate as indicated by the arrow in FIG. 7. The rotating rollers 52 then advance articles resting on the upper sides of the rollers.

Although in the preferred embodiment, the belt is a link belt with links connected by tabs, the present invention is broad enough to include other types of belts. For instance, other types of link belts can be used, such as a rivited link belt in which the overlapping links are rivited to each other. In addition, belts that are not link belts can be used, such as endless belts (i.e. belts made of a single length of material with the ends spliced together to form the belt). When using an endless belt, the belt material can be formed and the gripping layer 40 can be attached to the belt material before the ends of the belt are spliced together. Such a method is potentially more efficient then attaching the gripping layer after the ends of the belt are spliced together.

In addition, although the cushioning layer has been described as an elongated hollow generally cylindrical element, the invention is not limited to the particular type of cushioning layer. For instance, the cushioning layer may be solid or have relatively thick walls (i.e. thicker than ¼"). Further, the gripping layer may be formed of a fiber reinforced, metal reinforced or foamed thermoplastic urethane. Additionally, although the bonding surface 35 and gripping layer 40 are preferably formed of a thermoplastic urethane, the elements can be formed from other materials. However, it is desirable that the materials be selected to ensure a consistent secure bond between the belt and the gripping layer. Preferably, the bond is provided by thermally bonding the belt 15 and the gripping layer 40 as described above, so that the materials should be selected to provide a consistent secure thermal bond. In other instances however, it may be desirable to use a chemical adhesive as a primary or secondary bond between the gripping layer and the belt. If a chemical adhesive is used as a primary bond, it is possible to eliminate the thermal bond between the two layers. If the chemical adhesive is used as a secondary bond, preferably the chemical adhesive provides additional support to the thermal bond. If a chemical adhesive is used as a primary or secondary bond, the bonding surface and gripping layer should be formed of materials that can be securely connected by the chemical adhesive.

The gripping layer 40 has been described as a continuous generally cylindrically-shaped element, however the gripping layer can be formed into numerous different configurations. For instance, the gripping layer may have a half around, square, trapezoidal, rectangular or triangular cross-section. In addition, rather than being a single continuous element, the gripping layer can be formed of multiple layers or a series of separate segments of the same or different materials. Further, the upper surface of the gripping layer need not be a uniform continuous surface as described previously. In certain applications, the upper surface may form one of various profiles, such as a cogged profile formed of a series of notches formed to the top surface of the gripping layer. If the gripping layer is an extrusion, the profile can be formed into the extrusion after the material is extruded, but while the material is still hot so that the formed profile sets in the gripping layer.

Further, although the belt assembly 10 has been described as including a gripping layer 40, alternatively, one or more elements can be thermally bonded to the belt 15 in a manner similar to how the gripping layer is bonded to the belt. For instance one or more segments or components can be adhered to the surface of the belt to operate as pins, cogs, teeth or other elements rather than the continuous gripping layer, depending upon the application.

Figure 8:
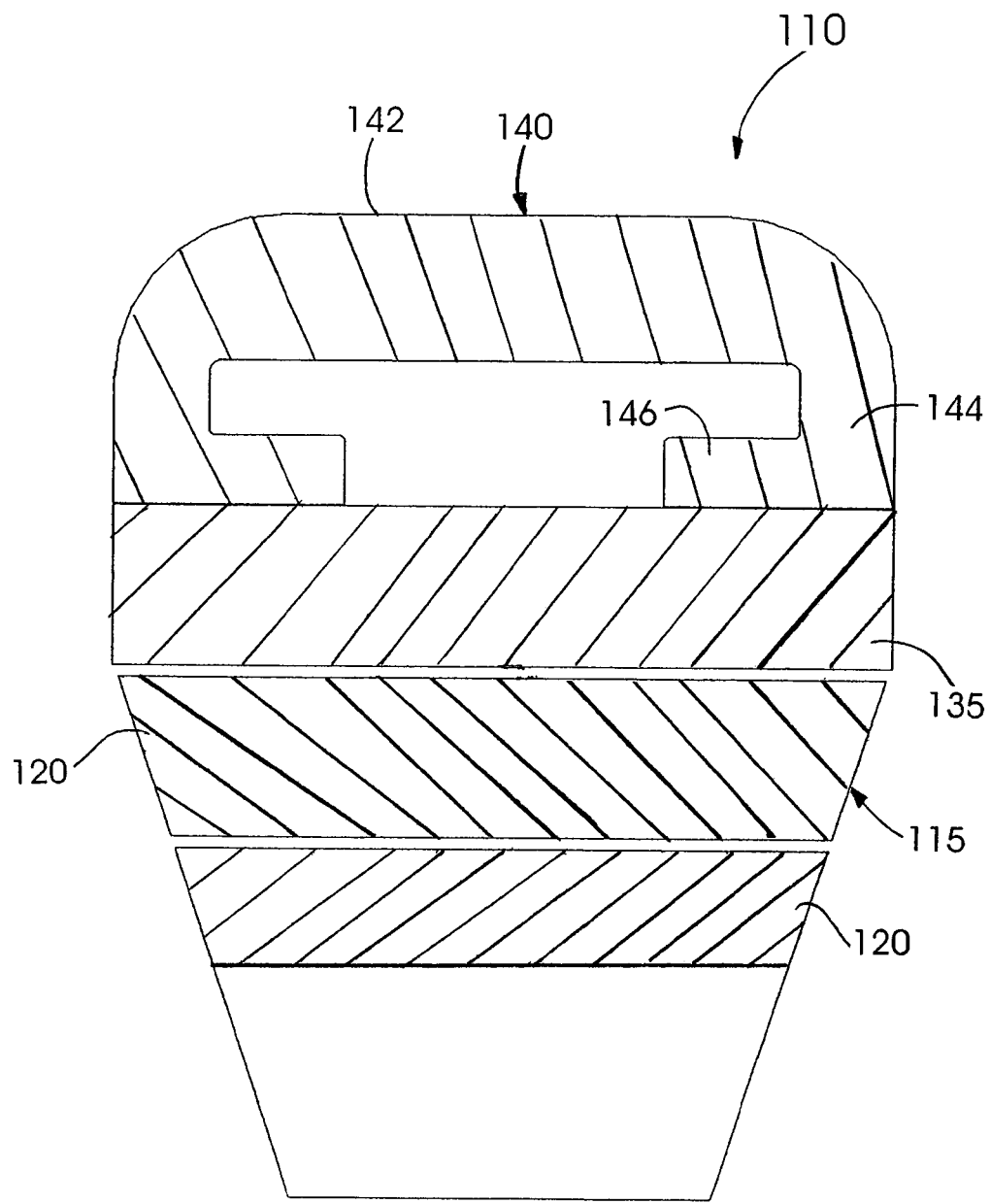
FIG. 8 is a cross-sectional view of an alternative embodiment of a conveyor assembly.

Referring now to FIG. 8 an alternate embodiment is illustrated. The alternate embodiment is similar to the embodiment illustrated in FIGS. 1-7 and described above, however, this alternate conveyor assembly 110 has a gripping element 140 that is configured differently from the gripping element 40 described previously. Accordingly, except where otherwise discussed below, elements in this second embodiment are preferably substantially similar to corresponding elements in the first embodiment and are designated with the same reference number with an additional 100. For instance, the belt links 120 in the second embodiment are substantially similar to the belt links 20 described in the first embodiment.

The alternate conveyor assembly 110 comprises a belt 115 having an upper surface to which a gripping or cushioning element 140 is attached. The gripping layer may extend outwardly overhanging the side edges of the belt 115. However, preferably the gripping layer is approximately as wide as the width of the belt or narrower.

The gripping element comprises an elongated channel having sidewalls 142 and a top surface 144 extending between the sidewalls. Preferably, the top surface is substantially flat across the width and along the length of the belt. In addition, preferably the top surface has a thickness that is greater than the thickness of the side wall.

Although the top surface 144 is illustrated as continuous between the sidewalls, the top surface may extend between the sidewalls without interconnecting the sidewalls. The bottom surface 146 of the gripping element may be continuous like the top surface, however, preferably a slot extends through the bottom surface along the length of the gripping element. The slot provides addition clearance for the top surface when the top surface is deformed downwardly. In other words, when the top surface of the belt 110 engages an item, the top surface 144 may deform downwardly into the hollow space within the gripping element 140 and into the recess formed by the slot in the bottom surface 146. This provides an greater distance for compression relative to the height of the sidewall than a similar element not having a slot, thus allowing a reduced profile for the gripping element. In addition, although the slot is shown as a through slot, the slot may be formed as a groove on the interior face of the bottom surface 146.

The gripping element 140 may be attached to the belt in any of the methods described above in connection with the first embodiment. However, preferably the gripping element 140 is adhered to the belt by heat fusing the gripping element with bonding layer 135 on the top of the belt.

As described in the first embodiment, the gripping element is preferably a unitary element that extends along substantially the entire length of the belt so that the gripping layer provides a continuous top surface around the belt. Rather than being a single piece, the gripping element may be two or more elements that are individually bonded to the surface of the belt, so that the structure is essentially the same as a single continuous piece. However, in certain instances, it may be desirable to form the gripping element into a plurality of segments that are bonded to the belt. Using a plurality of elements, the ends of the gripping elements may be connected to one another so that the gripping element pieces provide a substantially continuous outer surface. Alternatively, the gripping elements may be adhered to the belt so that there are gaps between adjacent gripping element, so that the outer surfaces of the gripping elements do not create a substantially continuous surface around the length of the belt.

The separate gripping elements may be separately formed and individually adhered to the belt. Alternatively, a continuous gripping element may be adhered to the belt as described above, and then the gripping element may be cut into a plurality of segments by cutting the gripping element transverse the length of the belt. The length of the gripping segments may vary. In some instances, the gripping segments may overlap a plurality of belt links. In other instances, to maximize the flexibility of the conveyor assembly, the gripping segments may be cut so that each belt link has a separate gripping segment, with each belt segments being shorter than the length of each belt link.

Figure 9A:
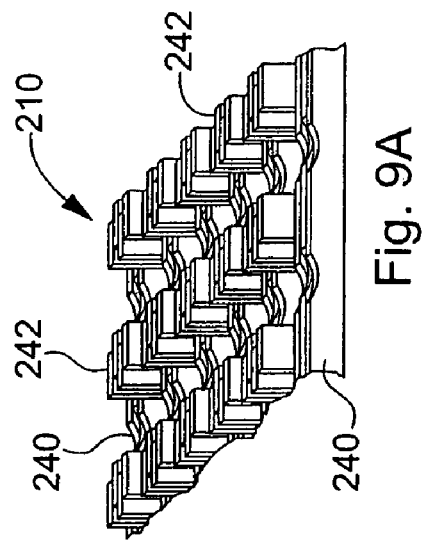
FIG. 9A is an enlarged fragmentary view of a portion of the conveyor assembly illustrated in FIG. 9.
Figure 9:
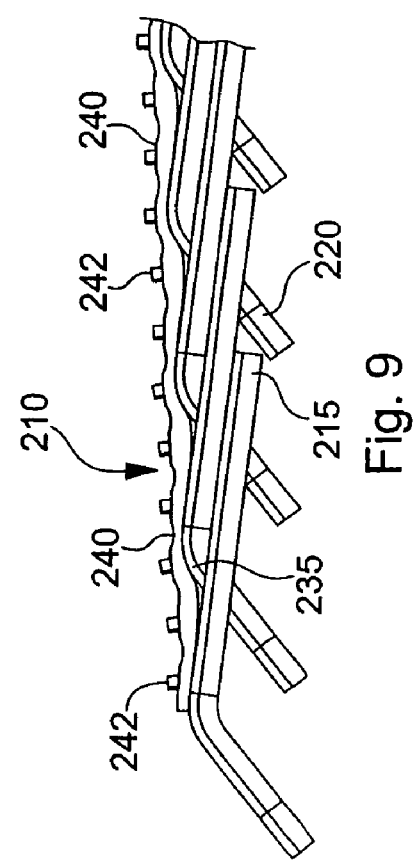
FIG. 9 is a perspective view of a second alternative embodiment of a conveyor assembly.
Figure 10:
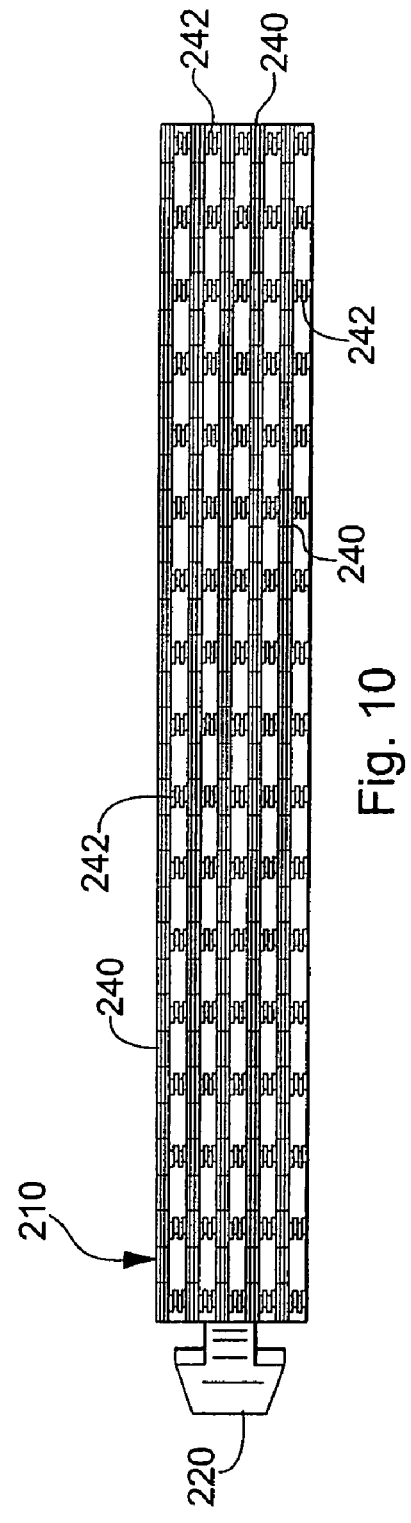
FIG. 10 is another perspective view of the conveyor assembly illustrated in FIG. 9.

Referring now to FIGS. 9 and 10, another alternative conveyor 210 assembly is illustrated. The conveyor 210 illustrates al alternative gripping or cushioning layer 240. As discussed further below, the gripping layer 240 comprises a plurality of protrusions that project upwardly from the surface of the belt 215 to increase the ability of the belt to grip and convey items on the belt.

The conveyor 210 comprises a link belt 215 formed of a series of overlapping belt links 220 similar to the link belt 15 described above. The top layer of each belt link comprises a bonding material 235 that is operable to bond the gripping layer 240 to the top surface of the belt. When the belt 215 is assembled, the bonding materials on the top surface of each belt link combine to form a bonding layer 235 that bonds with the gripping layer 240.

The gripping layer 240 covers a substantial portion of the length of the belt 215. In the present instance, the gripping layer 240 overlies substantially the entire length of the belt 215 to form a continuous top gripping layer when the ends of the belt 215 are connected to form a continuous loop.

In the embodiment in FIGS. 9 and 10, the gripping layer comprises a plurality of spaced apart nubs or fingers 242 that protrude upwardly. The nubs 242 may be spaced apart randomly along the surface of the gripping layer. However, in the present instance, the nubs 242 are spaced apart to form an array of rows and columns of nubs, as shown in FIG. 10. In addition, the height and width of each nub may vary. However, in the present instance, the nubs 242 are relatively short, with each numb having a height that is less than the width of the belt 215, and the combined width of the nubs across the width of the belt is less than the width of the belt, so that there is open space between adjacent nubs. Although the configuration of the nubs can vary, in the present instance, most or substantially all of the nubs are substantially the same height and substantially the same width.

The gripping layer 240 is formed of a resiliently deformable material. More specifically, preferably the gripping layer is formed of a single material, however, the gripping layer can be formed of multiple materials, such as a structure in which the numbs 242 are formed from a material that is different than the rest of the gripping layer. The nubs may be formed of a rigid material, however, in the present instance, the nubs are deformable. More specifically, the nubs may be deformable resiliently, wherein the nubs are compressible or deflectable laterally when an item is placed onto the surface of the cushioning layer. In the present instance, the gripping layer is formed of a resilient thermoformable plastic, such as urethane.

As discussed above, the gripping layer 240 is formed as a single layer that is positioned over top of the belt 215. In the present instance, the gripping layer 240 is formed of a thermoplastic that is thermally bonded to the top surface of the belt. The gripping layer 240 is preferably attached to the belt 215 after the belt is formed, but before the ends of the belt are connected to form a continuous loop. As described above, preferably the bonding surface 235 is formed of a thin layer of thermoplastic urethane that is adhered to the top surface of the belt links. To attach the gripping layer 240, the gripping layer is placed on top of the belt. Heat is then applied to the gripping layer and the bonding surface to fuse the gripping layer and bonding surface together. In other words, heat is applied so that the thin layer of urethane on the top surface of the belt melts together with the bottom surface of the gripping layer, which preferably is also formed of urethane.

Preferably the gripping layer 240 is a continuous layer that extends along the entire length of the belt 215. Accordingly, the ends of the gripping layer 240 are spliced together, preferable by heating the ends of the belt to fuse the ends together. In this way, preferably the gripping layer forms a continuous outer surface having a substantially uniform surface along the entire length of the belt.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

That which is claimed is:

1. A method for producing a belt, comprising the steps of:
    forming a belt having a top surface, wherein the step of forming a belt comprises forming a plurality of belt links and interconnecting the belt links to form a link belt, wherein the step of forming belt links comprises the steps of:
        providing sheet material onto which a bonding layer has been deposited; and
        cutting the belt links out of the sheet material;
    forming a compressible element having a resiliently deformable top surface, wherein the elongated element has first and second ends; and
    adhering the compressible element to the top surface of the belt to provide a resiliently deformable top surface on the belt, wherein the step of adhering comprises adhering the compressible element to the belt so that the first and second ends are adjacent one another after joining the ends of the belt.

2. The method of claim 1 wherein the bonding material is a heat fusible material, and the step of adhering comprises the step of beat fusing the compressible element to the top surface of the belt.

3. The method of claim 1 wherein the belt has a length and the step of forming a compressible element comprises forming an elongated compressible element having a length that is approximately as long as the belt.

4. The method of claim 1 wherein the step of forming a compressible element comprises extruding an elongated thermoplastic element.

5. The method of claim 1 wherein the step of forming a compressible element comprises forming an element comprising a plurality of spaced apart resiliently deformable nubs.

6. The method of claim 1 comprising the step of cutting through the compressible element in a direction transverse the longitudinal axis of the compressible element.

7. The method of claim 6 wherein the step of cutting comprises cutting the compressible element after the compressible element is adhered to the belt.

8. The method of claim 6 wherein the method comprises the step of disconnecting links adjacent a point on the compressible element that was cut during the step of cutting the compressible element, and replacing a belt link.

9. The method of claim 8 comprising the step of fusing cut ends of the compressible layer adjacent the replaced belt link.

10. The method of claim 1 wherein the step of producing a compressible element comprises forming an elongated compressible element having sidewalls and a resiliently deformable top surface extending between the sidewalls along the length of the compressible element.

11. The method of claim 10 wherein the step of forming a compressible element comprises forming a hollow element.

12. The method of claim 10 wherein the step of forming the compressible element comprises forming an elongated element having a width and a height, wherein the width is greater than the height.

13. The method of claim 1 wherein the step of forming a compressible element comprises forming a unitary elongated element having a length approximately as long as the length of the belt.

14. A method for producing a belt, comprising the steps of:
    forming a belt having a top surface and a length, wherein the step of forming a belt comprises forming a plurality of belt links and interconnecting the belt links to form a link belt, wherein the step of forming belt links comprises the steps of:
        providing sheet material onto which a bonding layer has been deposited; and
        cutting the belt links out of the sheet material;
    forming a compressible element having a resiliently deformable top surface and having a length that is approximately as long as the belt; and
    adhering compressible element to the top surface of the belt to provide a resiliently deformable top surface on the belt, so that the compressible element overlies approximately the length of the belt.

15. The method of claim 14 wherein the bonding material is a heat fusible material, and the step of adhering comprises the step of heat fusing the compressible element to the top surface of the belt.

16. The method of claim 14 wherein the step of forming a compressible element comprises extruding an elongated thermoplastic element.

17. The method of claim 14 wherein the step of forming a compressible element comprises forming an element comprising a plurality of spaced apart resiliently deformable nubs.

18. The method of claim 14 comprising the step of culling through the compressible element in a direction transverse the longitudinal axis of the compressible element.

19. The method of claim 18 wherein the step of culling comprises culling the compressible element after the compressible element is adhered to the belt.

20. A method for producing a belt, comprising the steps of:
- forming a belt having a top surface, wherein the step of forming a belt comprises forming a plurality of belt links and interconnecting the belt links to form a link belt, wherein the step of forming belt links comprises the steps of:
  - providing sheet material onto which a bonding layer has been deposited; and
  - cutting the belt links out of the sheet material;
- forming a compressible element having a resiliently deformable top surface;
- adhering the compressible element to the top surface of the belt to provide a resiliently deformable top surface on the belt overlying a plurality of belt links; and
- cutting the compressible element after the compressible element is attached to the belt.

21. The method of claim 20 wherein the step of cutting comprises culling the compressible element in a direction transverse the length of the belt.

22. The method of claim 20 wherein the step of cutting comprises cutting the compressible element into a plurality of segments.

23. The method of claim 20 wherein the bonding layer comprises a heat fusible material, and the step of adhering comprises the step of heat fusing the compressible element to the top surface of the belt.

24. The method of claim 20 wherein the belt has a length and the step of forming a compressible element comprises forming an elongated compressible element having a length that is approximately as long as the belt.

25. The method of claim 20 wherein the step of forming a compressible element comprises forming an element comprising a plurality of spaced apart resiliently deformable nubs.

26. The method of claim 20 wherein the compressible element comprises first and second ends, and the method comprises the step of heat welding the first and second ends of the compressible element.

27. The method of claim 26 wherein the step of connecting the first and second ends of the compressible element comprises connecting the first and second ends after a step of heat welding the bonding layer with the bottom surface of the compressible element.

* * * * *

UNITED STATES PATENT AND TRADEMARK OFFICE
CERTIFICATE OF CORRECTION

PATENT NO. : 7,241,354 B2
APPLICATION NO. : 10/978682
DATED : July 10, 2007
INVENTOR(S) : Fatato et al.

It is certified that error appears in the above-identified patent and that said Letters Patent is hereby corrected as shown below:

Col. 9, line 59;
Claim 2, line 3, " beat fusing " should read -- heat fusing --

Col. 10, line 62;
Claim 18, line 1, " of culling " should read -- of cutting --

Col. 10, line 65;
Claim 19, line 1, " of culling " should read -- of cutting --

Col. 10, line 66;
Claim 19, line 2, " comprises culling " should read -- comprises cutting --

Col. 11, line 19;
Claim 21, line 2, " comprises culling " should read -- comprises cutting --

Signed and Sealed this

Fourteenth Day of August, 2007

JON W. DUDAS
*Director of the United States Patent and Trademark Office*